United States Patent
Lee et al.

(10) Patent No.: US 8,553,726 B2
(45) Date of Patent: Oct. 8, 2013

(54) SCHEDULING TRANSMISSION OF MESSAGES RELATING TO MULTIMEDIA BROADCAST/MULTICAST SERVICE (MBMS)

(75) Inventors: Young Dae Lee, Seoul (KR); Sung Duck Chun, Seoul (KR); Seung June Yi, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 12/765,595

(22) Filed: Apr. 22, 2010

(65) Prior Publication Data
US 2010/0272001 A1    Oct. 28, 2010

Related U.S. Application Data

(60) Provisional application No. 61/172,193, filed on Apr. 23, 2009, provisional application No. 61/172,702, filed on Apr. 24, 2009.

(51) Int. Cl.
*H04J 1/00*    (2006.01)
(52) U.S. Cl.
USPC .............................. 370/480; 37/328

(58) Field of Classification Search
USPC ................ 370/310–350, 436, 437, 441, 479, 370/480, 485
See application file for complete search history.

(56) References Cited

U.S. PATENT DOCUMENTS

| | | | |
|---|---|---|---|
| 2005/0195852 A1* | 9/2005 | Vayanos et al. | 370/437 |
| 2008/0170557 A1* | 7/2008 | Yin | 370/343 |
| 2008/0291866 A1* | 11/2008 | Fukui | 370/328 |
| 2011/0044225 A1* | 2/2011 | Rinne et al. | 370/312 |

* cited by examiner

*Primary Examiner* — Ricky Ngo
*Assistant Examiner* — Wei-Po Kao
(74) *Attorney, Agent, or Firm* — Lee, Hong, Degerman, Kang & Waimey

(57) ABSTRACT

In a network, at least first and second messages (801, 802) are transmitted to a user equipment (UE) regarding multimedia point-to-multipoint services. The first messages comprise information regarding a first set of at least one service and the second messages comprise information regarding a second set of at least one service. The transmission of first messages is scheduled with a first periodicity (T1) and the transmission of second messages is scheduled with a second periodicity (T2), the first periodicity being independent from said second periodicity. Therefore, an overhead caused by transmitting of unnecessary information can be reduced.

13 Claims, 7 Drawing Sheets

SCHEDULING TRANSMISSION OF MESSAGES RELATING TO MULTIMEDIA BROADCAST/MULTICAST SERVICE (MBMS)

CROSS-REFERENCE TO RELATED APPLICATIONS

Pursuant to 35 U.S.C. §119, this application claims the benefit of U.S. Provisional Application Ser. No. 61/172,193, filed on Apr. 23, 2009, and U.S. Provisional Application Ser. No. 61/172,702, filed on Apr. 24, 2009, the contents of all of which are hereby incorporated by reference herein in their entirety.

BACKGROUND

1. Technical Field

The present invention relates to wireless communications, and more particularly, to a method of scheduling transmission/reception of messages relating to multimedia broadcast/multicast service (MBMS).

2. Related Art

Multimedia Broadcast and Multicast Services (MBMS) correspond to broadcasting services which can be offered in GSM and UMTS cellular networks. Such services can be mobile TV services for instance.

All UEs ('User Equipment' or terminal), supporting MBMS, receive MBMS information ('MI') from UTRAN ('UMTS Terrestrial Radio Access Network') concerning the way MBMS services provided in their location. Most of MBMS information is provided on the MCCH channel. The MCCH channels are used as downlink point-to-multipoint downlink channels to transmit this MCCH information. In general, one cell has one corresponding MCCH.

This MBMS information on MCCH channel is transmitted using a fixed schedule, which is common for all services. Most of MCCH information is transmitted periodically based on a repetition period. This MCCH information is repeated a configurable number of times with exactly the same content. The time period in which the content of this MCCH information remains unchanged is called the 'modification period'.

MCCH information can be modified in a modification period, more precisely, at the beginning of the modification period. Moreover, inside one modification period, the MCCH information is repeated according to the repetition period.

Then, MCCH information sent periodically can contain both Unmodified Service Information (USI), repeating control information which are not modified for a service, and Modified Service Information (MSI), indicating control information modified for a service. After a time, MSI is considered as unmodified and then it is included in USI.

According to this MCCH information transmission scheduling, it can be noted that the transmission of MCCH information could be not useful. Actually, for instance, it is not useful for a UE to receive often USI, except in the following situations: when a radio link failure occurs between the network and the UE, and when the mobility of the UE makes it to change of service areas.

For instance, in LTE ('Long Term Evolution') architecture, a plurality of MBSFN areas ('Multi-Media Broadcast over a Single Frequency Network') can be defined, each MBSFN area having one MCCH channel to transmit MCCH information to all UEs in said MBSFN area. In these conditions, because of mobility, a UE could be located in another MBSFN area and consequently it will receive MCCH information on another MCCH channel. In this case, the UE must receive all MCCH information including MSI and USI to be able to receive service inside the MBSFN area where it is located now.

But, in general, when the radio link is reliable and the UE does not move enough to change its MBSFN area, it could be not very useful to receive often the USI.

It is important to note that a transmission of not useful information generates overhead.

Accordingly, there is a need for a method of effectively transmitting MCCH information in a MBMS system.

SUMMARY

The present invention provides a method of receiving a multimedia broadcast/multicast service (MBMS) in a cell-based wireless communication system so as to smoothly receive the MBMS by effectively obtaining information regarding the MBMS.

According to an aspect of the present invention, a method of transmitting at least first and second messages regarding multimedia point-to-multipoint services in a network is provided. The first messages comprise information regarding a first set of at least one service and the second messages comprise information regarding a second set of at least one service. In these conditions, the transmission of the first messages is scheduled with a first periodicity and the transmission of the second messages is scheduled with a second periodicity, the first periodicity being independent from the second periodicity.

It is possible to schedule the transmission of information regarding a first set of service and the transmission of information regarding a second set of service with independent periodicities.

The first messages can have the same content as the second messages, or they can have content different from the content of the second messages.

Thanks to these characteristics, the transmission of information regarding the first set of service can be performed more frequently than the transmission of information regarding the second set of service. Then it is easy to adapt the scheduling of transmission depending on type of information transmitted inside the first and the second messages.

The term 'independent' means that the first periodicity and the second periodicity are defined in an independent way. Consequently, the first periodicity is not defined as a function of the second periodicity. The first periodicity can be lower or greater than the second one, or the first periodicity can be equal to the second periodicity. There is no link, which allows determining one periodicity from the other one, between the respective values of the first and the second periodicities.

It could be advantageous to define the first periodicity as a function of the content of the first messages and the second periodicity as a function of the content of the second messages. In this context, when the first and the second messages have the same content, it could be possible to apply a first periodicity which is equal to a second periodicity.

Advantageously, based on the independence of the first and the second periodicity, it is possible to reduce overhead generated by repetition of information MCCH transmission in a MBMS system. Indeed, in this context, it is possible to define the scheduling of messages transmission depending on the type of information comprised in them. These characteristics introduce a high flexibility regarding the transmission scheduling in a MBMS system. According to this flexibility, it is possible to reduce substantially the overhead generated by sending information which is repeated too often regarding its utility for UEs.

Of course, it must be noted that such a method can be easily applied to more than first and second messages. Indeed, it is easy to apply the present invention to N messages, N being greater than 2.

MCCH information can include one or more control messages, like RRC message, MBMS Modified Services Information (MSI), MBMS Unmodified Services Information (USI), MBMS point-to-multipoint radio bearer information or access information for instance.

According to one embodiment of the present invention, MCCH scheduling could be based on SI approach like BCCH. Then, Two SI blocks can be used: one for modified MCCH information and another one for unmodified MCCH information. The terms 'modified MCCH information' correspond to any information indicating that a changes for a service.

In one embodiment of the present invention, the first set of at least one service comprises unmodified services and the second set of at least one service comprises modified services. In these conditions, it can be advantageous to define two values of periodicity for those two types of messages. Indeed, it can allow avoiding to send too often unmodified service information which should be already known by the most of UEs in the considered area. These first and second periodicities can be defined independently. Here, the first periodicity can be advantageously lower than the second periodicity.

In a classical MBMS context, UEs would read unmodified part of MCCH information only when they fail to keep track of MCCH information, meaning because of a radio link failure, or because of mobility. Consequently, a UE would read unmodified part of the MCCH information only rarely. Consequently, the case of reading unmodified MCCH information would occur less frequently than the case of reading modified MCCH information. It is then advantageous to schedule a transmission of the unmodified information less frequently than a transmission of the modified information.

In one embodiment of the present invention, the first periodicity and the second periodicity being defined according to characteristics of service in the first set and to characteristics of service in the second set respectively.

Thanks to these characteristics, the scheduling of transmission can be adapted to optimize the transmission resource in the network depending of type of services which are offered. Indeed, advantageously, the periodicity of information transmission is directly dependant on the characteristics of the concerned services in the first set and in the second set, and then transmission resources can be used in an optimal way. Indeed, for some services, it can be more important to send modified service information rapidly than for other services.

In one embodiment, the first set of at least one service comprises at least one service offered in a first area and the second set of at least one service comprises at least one service offered in a second area, which is different from the first area.

These characteristics are notably advantageous when they are applied in a network comprising a plurality of service areas offering respective different set of services. Here, depending on the type of services offered in different areas, it is possible to adapt the periodicity of service information transmission.

The first and second areas can be different multimedia broadcast service single frequency network (MBSFN) areas. It can be the case notably in a LTE architecture.

The first and second messages can be transmitted on the multicast control channel (MCCH).

In one embodiment of the present invention, information indicating the first and second periodicities is sent in the network before sending first and second messages. Thanks to these characteristics, the UEs can be informed in advance about the different transmission periodicities.

According to another aspect of the present invention, a method of receiving at least first and second messages regarding multimedia point-to-multipoint services in a network is provided. The first messages comprise information regarding a first set of at least one service and the second messages comprise information regarding a second set of at least one service. The reception of first messages is scheduled with a first periodicity and the reception of second messages is scheduled with a second periodicity. The first periodicity is independent from the second periodicity.

According to another aspect of the present invention, a Radio Access Network in a MBMS system offering multimedia point-to-multipoint services is provided.

This Radio Access Network comprises:
- a transmitter adapted to transmit to a user equipment at least first and second messages regarding multimedia point-to-multipoint services in a network, said first messages comprising information regarding a first set of at least one service and said second messages comprising information regarding a second set of at least one service;
- a scheduler adapted to schedule transmission of first messages with a first periodicity and to schedule transmission of second messages with a second periodicity, said first periodicity being independent from said second periodicity.

According to another aspect of the present invention, a terminal in a MBMS system offering multimedia point-to-multipoint services is provided.

This terminal comprises:
- a receiver adapted to receive at least first and second messages regarding multimedia point-to-multipoint services in a network; said first messages comprising information regarding a first set of at least one service and said second messages comprising information regarding a second set of at least one service; and
- a scheduler adapted to schedule the reception of first messages with a first periodicity and second messages with a second periodicity, said first periodicity being independent from said second periodicity.

DESCRIPTION OF EXEMPLARY EMBODIMENTS

Hereinafter, a method of receiving multimedia broadcast/multicast service (MBMS) and a method of transmitting the MBMS will be described according to embodiments of the present invention.

Figure 1:
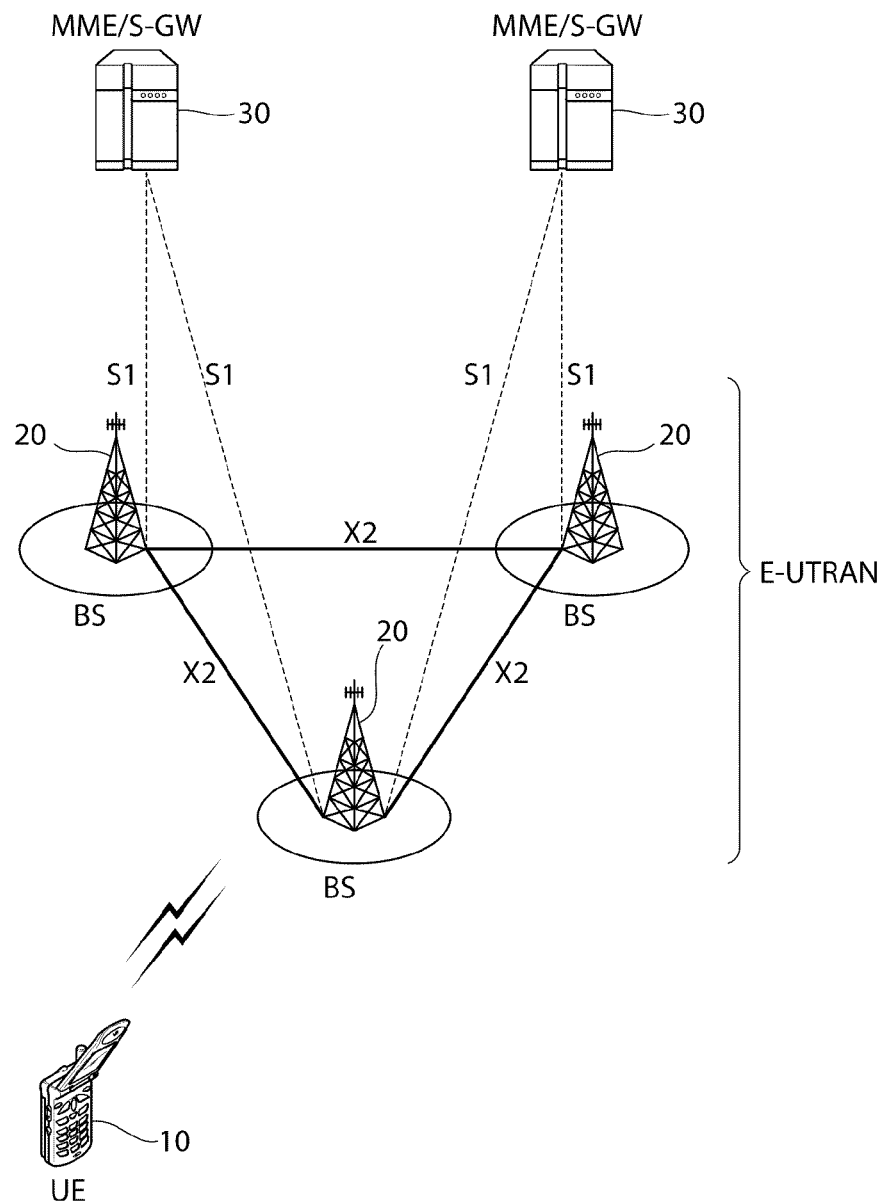
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
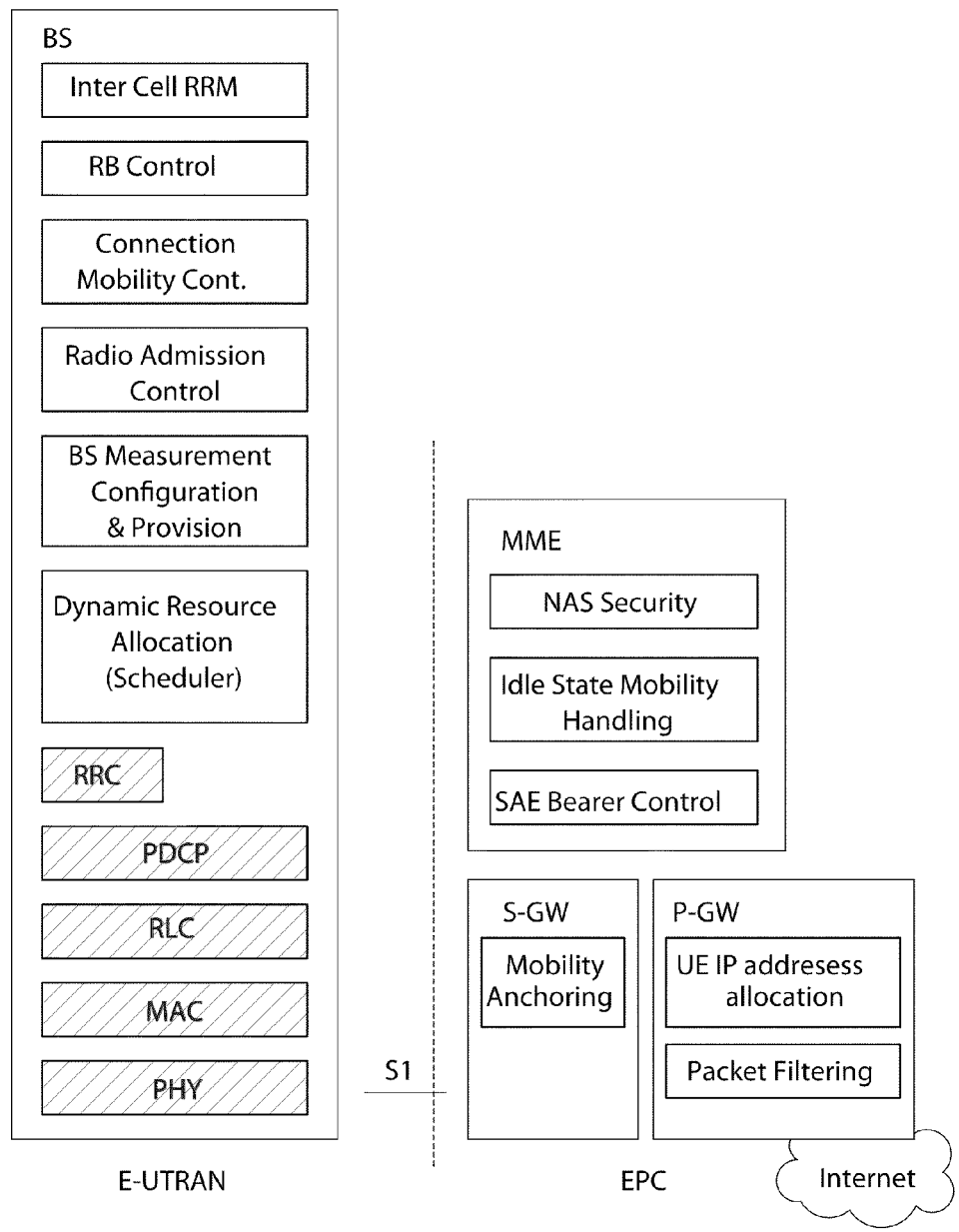
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane. A BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (internet protocol) allocation and (2) packet filtering.

Figure 3:
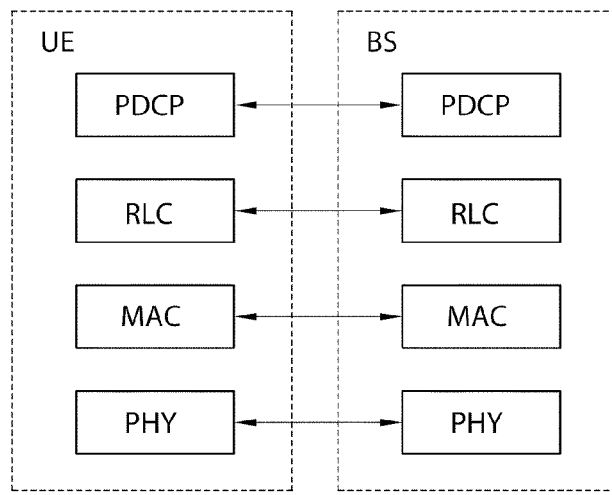
FIG. 3 is a block diagram showing radio protocol architecture for a user plane.
Figure 4:
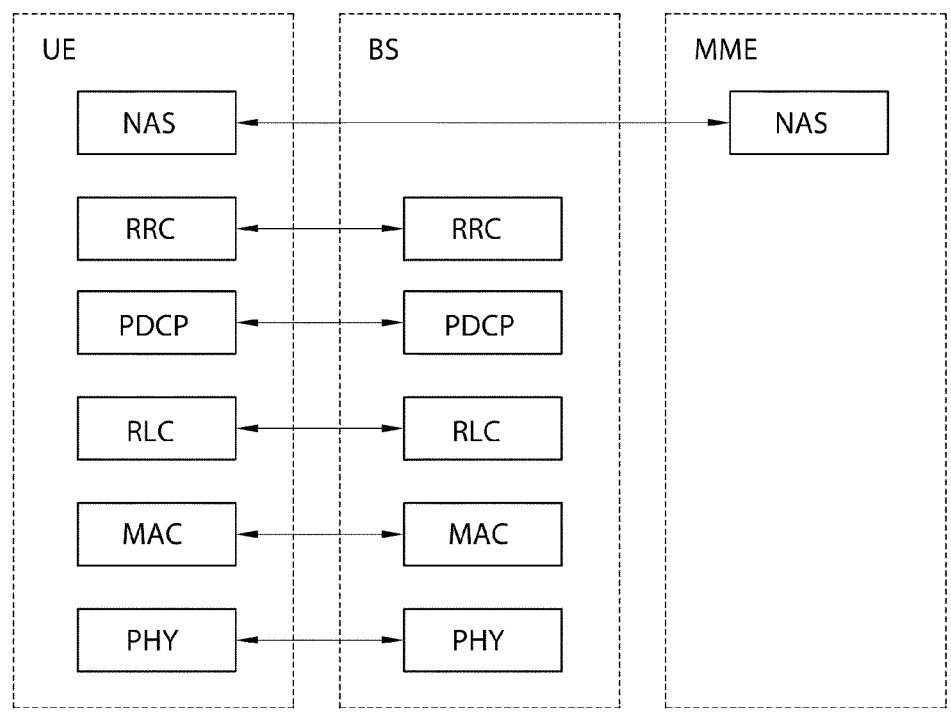
FIG. 4 is a block diagram showing radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to an upper layer by using a physical channel. The PHY layer is connected with a MAC (Medium Access Control) layer, i.e., an upper layer of the PHY layer, through transport channels. Data is transferred between the MAC layer and the PHY layer through the transport channels. The transport channels are classified by how and with what characteristics data are transferred over the radio interface. Between different physical layers, i.e., the physical layer of a transmitter and the physical layer of a receiver, data is transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NACK signals in response to uplink transmissions. A physical uplink control channel (PUCCH) carries uplink control information such as HARQ ACK/NACK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ) scheme.

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

The RRC (Radio Resource Control) layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
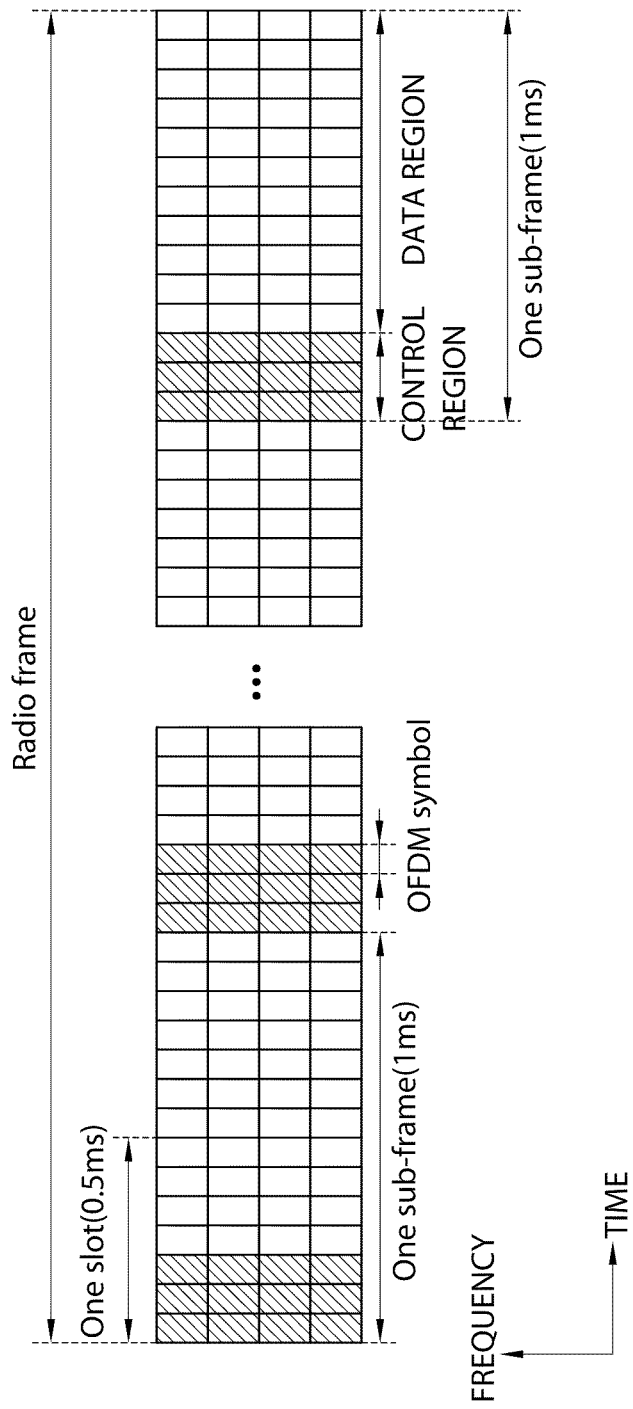
FIG. 5 shows an example of a radio frame structure.

FIG. 5 shows an example of a radio frame structure.

Referring to FIG. 5, a radio frame includes 10 subframes, and a subframe includes 2 slots. The time used to transmit a subframe is referred to as a transmission time interval (TTI). For example, the length of a subframe is 1 ms and the length of a slot can be 0.5 ms.

One slot includes a plurality of orthogonal frequency division multiplexing (OFDM) symbols in time domain. In a normal cyclic prefix (CP), a slot includes 7 OFDM symbols, and in an extended CP, a slot includes 7 OFDM symbols.

An OFDM symbol is for expression of a symbol duration in time domain because OFDMA is used for downlink transmission in 3GPP LTE, the OFDM symbol can be regarded as a SC-FDMA symbol or symbol duration.

A resource block is a unit of resource assignment in 3GPP LTE, and it includes a plurality of consecutive subcarriers, i.e. 12 subcarriers, in a slot.

As shown in 3GPP TS 36.211 V8.5.0 (2008-12) "Evolved Universal Terrestrial Radio Access (E-UTRA); Physical Channels and Modulation (Release 8)", a physical channel in LTE is divided into PDSCH (Physical Downlink Shared Channel), PUSCH (Physical Uplink Shared Channel), PDSCH (Physical Downlink Control Channel), and PUCCH (Physical Uplink Control Channel).

A subframe is divided into a control region and a data region in time domain. The control region comprises at most three OFDM symbols in a first slot of a subframe, and the number of OFDM symbols in the control region can be various. PDCCH is allocated to the control region, and PDSCH is allocated to the data region.

Figure 6:
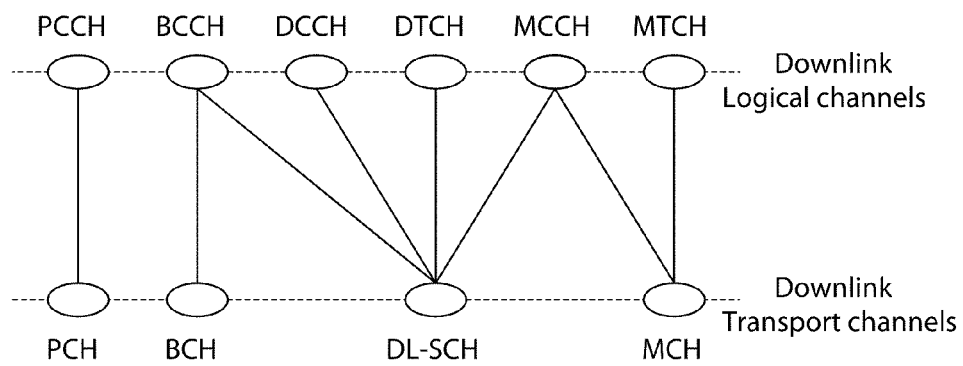
FIG. 6 shows mapping between downlink logical channels and downlink transport channels.

FIG. 6 shows mapping between downlink logical channels and downlink transport channels.

Referring to FIG. 6, a paging control channel (PCCH) can be mapped to a paging channel (PCH). A broadcast control channel (BCCH) can be mapped to a broadcast channel (BCD) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and a network and is used for UEs having no RRC connection with the network. The MCCH is a point-to-multipoint downlink channel used for transmitting multimedia broadcast multicast service (MBMS) control information from the network to the UE for one or several MTCHs and is only used by UEs that receive MBMS. The DCCH is a point-to-point bi-directional channel that transmits dedicated control information between a UE and the network and is used by UEs having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARM), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Figure 7:
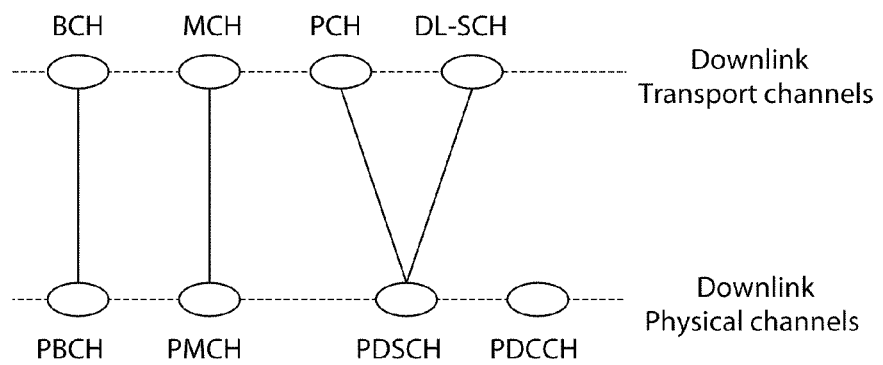
FIG. 7 shows mapping between downlink transport channels and downlink physical channels.

FIG. 7 shows mapping between downlink transport channels and downlink physical channels.

Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

A multimedia broadcast multicast service (MBMS) uses two logical channels, that is, an MCCH (i.e., a control channel) and an MTCH (i.e., a traffic channel). User data (e.g., actual voice or video) is transmitted on the MTCH. Configuration information for receiving the MTCH is transmitted on the MCCH. The MTCH and the MCCH are point-to-multipoint downlink channels for a plurality of UEs and can be regarded as common channels. In the MBMS, an amount of allocated radio resources does not coincide with the number of UEs receiving services. Instead, only radio resources for the common channels are allocated and the common channels are simultaneously received by the plurality of UEs, thereby improving efficiency of the radio resources.

Figure 8:
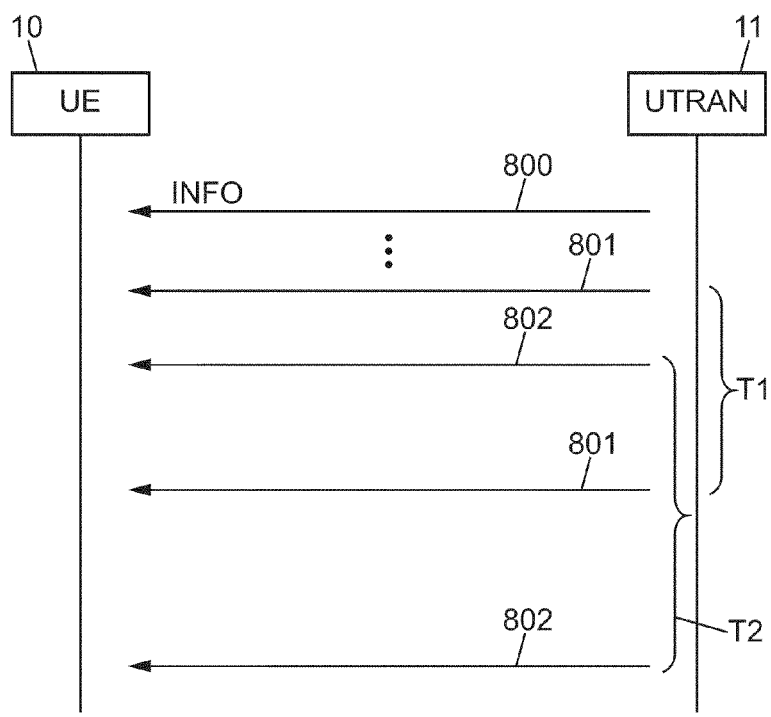
FIG. 8 illustrates the main steps for scheduling transmission and reception of information regarding point-to-multipoint services according to one embodiment of the present invention.

FIG. 8 illustrates the main steps of a method of scheduling the transmission/reception of information regarding one or more point-to-multipoint services according to one embodiment of the present invention.

Firstly, UTRAN 11 can emit an INFO message 800 informing UE about the periodicity of first and second messages regarding control information of first and second set of services. The UE can then optimize the reception of information. Such information can be broadcast on BCCH channel.

After, first messages 801 are periodically transmitted by UTRAN and received by UE 10 with a first periodicity T1. These first messages 801 include control information about at least one point-to-multipoint service. Second messages 802 are periodically sent by UTRAN and received by UE with a second periodicity T2. These second messages 802 include control information about at least one point-to-multipoint service.

The first and second messages can contain different types of information as, for instance, unmodified service information and modified service information.

Moreover, the first and second messages can also be two messages sent in different service area and then, they can contain information about different services. In this case, the periodicities can be defined as a function of different constraints associated to these different services. In addition, even in this case, inside a given service area, different periodicities can be defined for transmission of information regarding different services and/or regarding unmodified and modified service information.

In one embodiment, a MI (MCCH Information) window is defined for scheduling transmission of MCCH information on MCH. UE can be informed, on BCCH of a cell, about the way to check MBSFN subframes within the MI window to receive MCCH information on MCH. It is important to note that different MCCH information messages can be dedicated to different services. These different messages could be scheduled in different MI windows with different periodicities according to one embodiment of the present invention. Such periodicities can be dependant on different service requirements.

Figure 9:
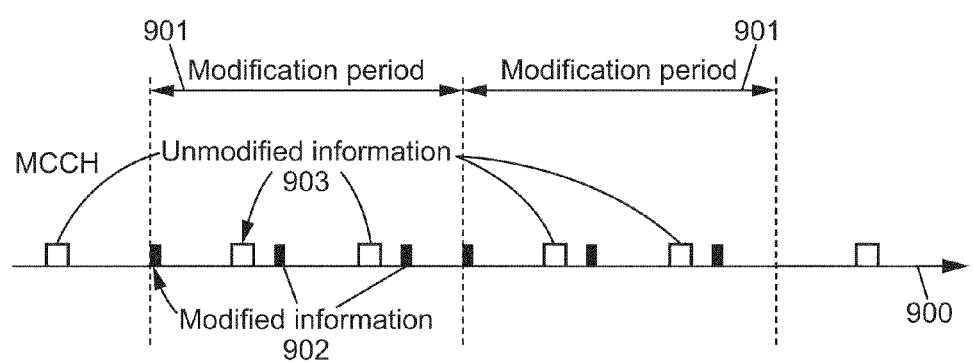
FIG. 9 illustrates a scheduling for transmission and reception of information regarding point-to-multipoint services according to one embodiment of the present invention.

FIG. 9 illustrates a scheduling for transmission and reception of information regarding point-to-multipoint services according to one embodiment of the present invention.

MCCH information is transmitted on MCCH channel 900 and can correspond to modified service information (MSI) and unmodified service information (USI).

According to this embodiment, it is planned to send USI in first messages 903 and MSI in second messages 902. The first messages 903 are sent with a first periodicity and the second messages 902 are sent with a second periodicity. It is advantageous here to define the first periodicity lower than the second periodicity.

In a MBMS system, upon a setup of a point-to-multipoint radio bearer, UEs completely read MCCH information for an activated service. After that, the UEs would not read MCCH information for the same service, meaning until session stop, because it is not useful, except if a radio link failure occurs or because of UE mobility. Indeed, generally, after the MCCH information for the service is generated and sent by UTRAN to UEs, the MCCH information for the considered service would not be changed, until session stop. Thus, some UEs would never read unmodified service information of the MCCH information for a MBMS service.

Therefore, according to one embodiment, modified service information and unmodified service information are carried in respective different MCCH information messages with periodicities which can be defined as a function of the type of information comprised in said messages. Thus, the unmodified MCCH information may be less frequently scheduled than the modified MCCH information because most of MBMS UEs would not read unmodified MCCH information once they completely read it.

When a session starts, modified MCCH information sent by UTRAN informs UEs about an incoming service. The modified MCCH information is then repeated for some time in order to ensure that every UE that activated the considered service acquires the modified MCCH information. After some time, the modified MCCH information can be no more broadcast and then can be inserted into unmodified MCCH information.

Figure 10:
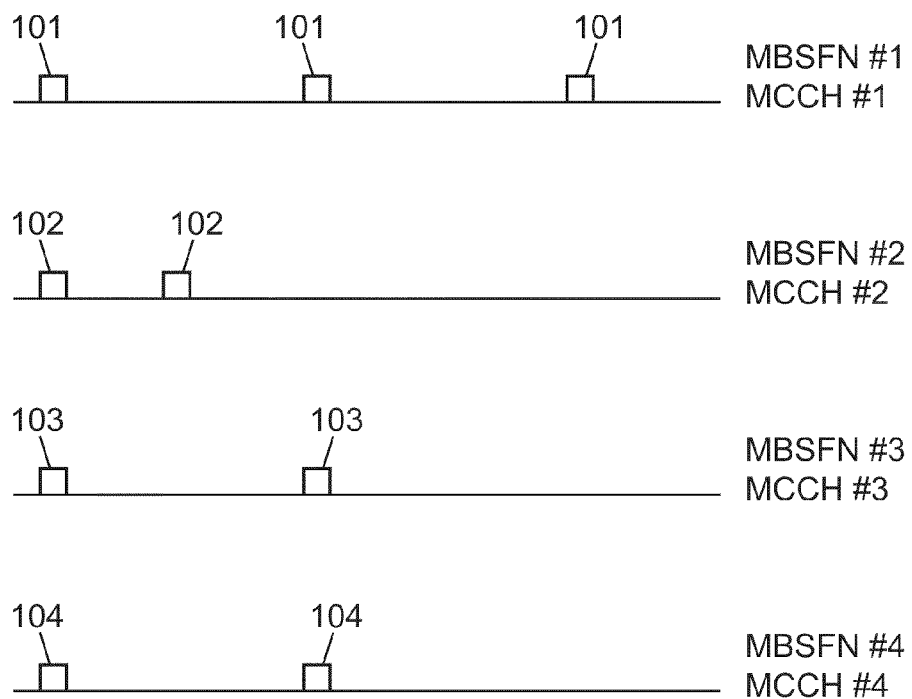
FIG. 10 illustrates a scheduling of MCCH information transmission in LTE architecture with different MBSFN areas according to one embodiment of the present invention.

FIG. 10 illustrates a scheduling of MCCH information transmission in LTE architecture with different MBSFN areas according to one embodiment of the present invention.

The Multimedia Broadcast Single Frequency Network (MBSFN) is introduced in LTE architecture to deliver services such as mobile TV for instance. One MBSFN area can correspond to a geographical coverage of a plurality of cells in a cell-based wireless communication network. Some cells can belong to a plurality of MBSFN areas.

According to such architecture in one embodiment of the present invention, each MBSFN area has one MCCH channel. For instance, in one system according to the present invention, a MBSFN area #1 has the MCCH #1, a MBSFN area #2 has the MCCH #2, a MBSFN area #3 has the MCCH #3 and a MBSFN area #4 has the MCCH #4.

On FIG. 10, in the MBSFN area #1, first messages 101 are transmitted according to a first periodicity, in the MBSFN area #2, second messages 102 are transmitted according to a second periodicity, in the MBSFN area #3, third messages 103 are transmitted according to a third periodicity, and in the MBSFN area #4, fourth messages 104 are transmitted according to a fourth periodicity. Advantageously, these first, second, third and fourth periodicities can be defined in an independent way. Consequently, they can be defined as a function of the characteristics of the services offered in each MBSFN area.

What is claimed is:

1. A method of transmitting to a user equipment (UE) at least first and second messages regarding multimedia point-to-multipoint services in a network, the method comprising:
   transmitting said first messages to the UE according to a first multicast control channel (MCCH) configuration for a first multimedia broadcast service single frequency network (MBSFN) area; and
   transmitting said second messages to the UE according to a second MCCH configuration for a second MBSFN area,
   said first messages comprising information regarding a first set of at least one service and said second messages comprising information regarding a second set of at least one service;
   wherein the transmission of said first messages is scheduled with a first periodicity according to the first MCCH configuration and the transmission of said second messages is scheduled with a second periodicity according to the second MCCH configuration;
   said first periodicity being independent from said second periodicity; and
   wherein said first periodicity and said second periodicity are repetition periods in at least one modification period.

2. The method of claim 1,
   wherein the first set of at least one service comprises unmodified service and the second set of at least one service comprises modified service; and
   wherein the first periodicity is lower than the second periodicity.

3. The method of claim 1, wherein the first periodicity and the second periodicity are defined according to characteristics of service in the first set and to characteristics of service in the second set, respectively.

4. The method of claim 3, wherein the first set comprises at least one service offered in the first MBSFN area and the second set comprises at least one service offered in the second MBSFN area different from the first MBSFN area.

5. The method of claim 1, wherein the first and second messages are transmitted on the multicast control channel (MCCH).

6. The method of claim 1, wherein information indicating the first and second periodicities is sent to the UE before the transmission of said first messages and the transmission of said second messages.

7. A method of receiving by a user equipment (UE) at least first and second messages regarding multimedia point-to-multipoint services in a network, the method comprising:
   receiving, by the UE, said first messages according to a first multicast control channel (MCCH) configuration for a first multimedia broadcast service single frequency network (MBSFN) area; and receiving, by the UE, said second messages according to a second MCCH configuration for a second MBSFN area, said first messages comprising information regarding a first set of at least one service and said second messages comprising information regarding a second set of at least one service;

wherein the reception of said first messages is scheduled with a first periodicity according to the first MCCH configuration and the reception of said second messages is scheduled with a second periodicity according to the second MCCH configuration, said first periodicity being independent from said second periodicity; and wherein said first periodicity and said second periodicity are repetition periods in at least one modification period.

8. The method of claim 7, wherein the first set of at least one service comprises unmodified service and the second set of at least one service comprises modified service; and wherein the first periodicity is lower than the second periodicity.

9. The method of claim 7, wherein the first periodicity and the second periodicity are defined according to characteristics of service in the first set and to characteristics of service in the second set, respectively.

10. The method of claim 7, wherein the first set comprises at least one service offered in the first MBSFN area and the second set comprises at least one service offered in the second MBSFN area different from the first MBSFN area.

11. The method of claim 7, wherein information indicating the first and second periodicities is received by the UE before the reception of said first messages and the reception of said second messages.

12. A Radio Access Network in a Multimedia Broadcast/Multicast Service (MBMS) system offering multimedia point-to-multipoint services, said Radio Access Network comprising:

a transmitter adapted to transmit to a user equipment (UE) at least first and second messages regarding multimedia point-to-multipoint services in a network, wherein said first messages are transmitted according to a first multicast control channel (MCCH) configuration for a first multimedia broadcast service single frequency network (MBSFN) area, and wherein said second messages are transmitted according to a second MCCH configuration for a second MBSFN area, said first messages comprising information regarding a first set of at least one service and said second messages comprising information regarding a second set of at least one service; and a scheduler adapted to schedule the transmission of said first messages with a first periodicity according to the first MCCH configuration and to schedule the transmission of said second messages with a second periodicity according to the second MCCH configuration, said first periodicity being independent from said second periodicity, wherein said first periodicity and said second periodicity are repetition periods in at least one modification period.

13. A User Equipment (UE) in a Multimedia Broadcast/Multicast Service (MBMS) system offering multimedia point-to-multipoint services, said UE comprising:

a receiver adapted to receive at least first and second messages regarding multimedia point-to-multipoint services in a network, wherein said first messages are received according to a first multicast control channel (MCCH) configuration for a first multimedia broadcast service single frequency network (MBSFN) area, and wherein said second messages are received according to a second MCCH configuration for a second MBSFN area, said first messages comprising information regarding a first set of at least one service and said second messages comprising information regarding a second set of at least one service; and a scheduler adapted to schedule the reception of said first messages with a first periodicity according to the first MCCH configuration and to schedule the reception of said second messages with a second periodicity according to the second MCCH configuration, said first periodicity being independent from said second periodicity, wherein said first periodicity and said second periodicity are repetition periods in at least one modification period.

* * * * *